United States Patent [19]

Berg

[11] 3,840,133
[45] Oct. 8, 1974

[54] BOAT TRAILER LOADING AND SUPPORTING DEVICE

[76] Inventor: Albert L. Berg, 3314 Spring Street, Fort Wayne, Ind. 46808

[22] Filed: May 31, 1973

[21] Appl. No.: 365,521

[52] U.S. Cl.................................. 214/450, 214/85
[51] Int. Cl................................................ B60r 9/00
[58] Field of Search..................... 214/450, 85, 85.1; 224/42.1 H

[56] References Cited
UNITED STATES PATENTS
| | | |
|---|---|---|
| 3,648,866 | 3/1972 | Slown ................................ 214/450 |
| 3,687,318 | 8/1972 | Casey................................. 214/450 |
| 3,732,998 | 5/1973 | Martin ............................... 214/450 |
| 3,734,321 | 5/1973 | Long................................... 214/450 |

Primary Examiner—Robert J. Spar
Assistant Examiner—John Mannix
Attorney, Agent, or Firm—Albert L. Jeffers; Roger M. Rickert

[57] ABSTRACT

A support device for a boat trailer, especially adapted for mounting on a pickup truck and including ramps for guiding the boat trailer from the ground up on the support device on the pickup truck. The device includes a power operated winch for drawing the boat trailer up on the device and the ramps referred to are detachable for storage on the boat trailer thereby clearing the cargo space of the pickup truck for receiving further load.

6 Claims, 14 Drawing Figures

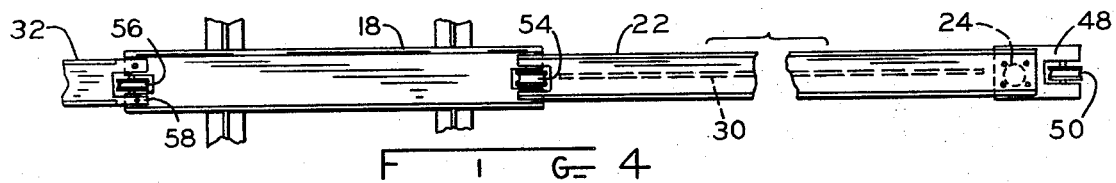
FIG. 4
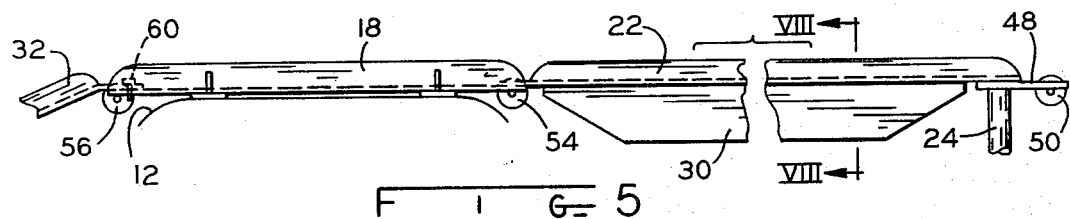
FIG. 5
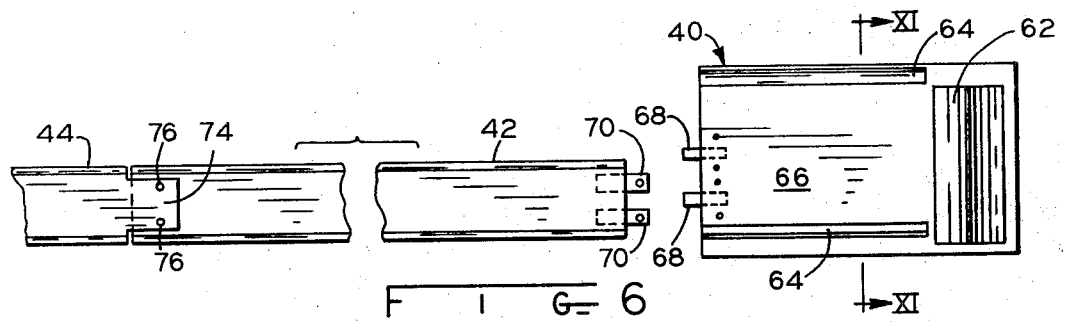
FIG. 6
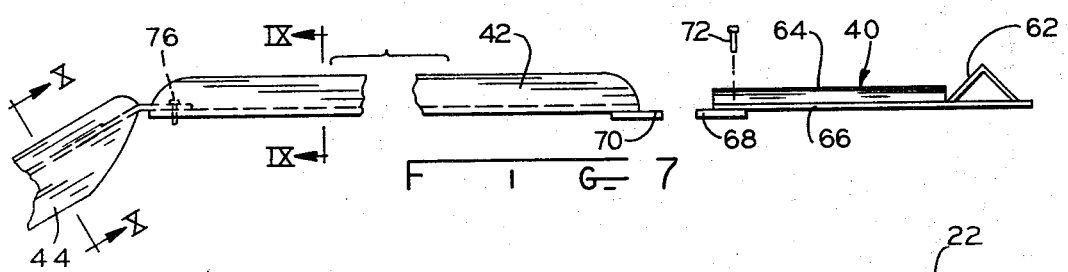
FIG. 7
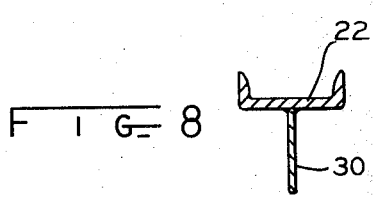
FIG. 8
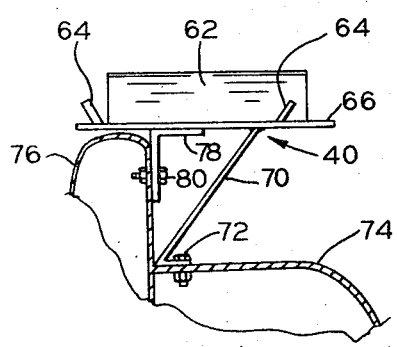
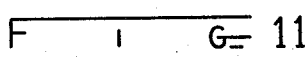
FIG. 11
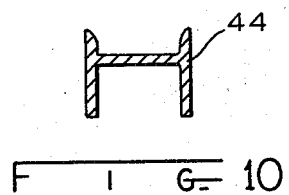
FIG. 9
FIG. 10

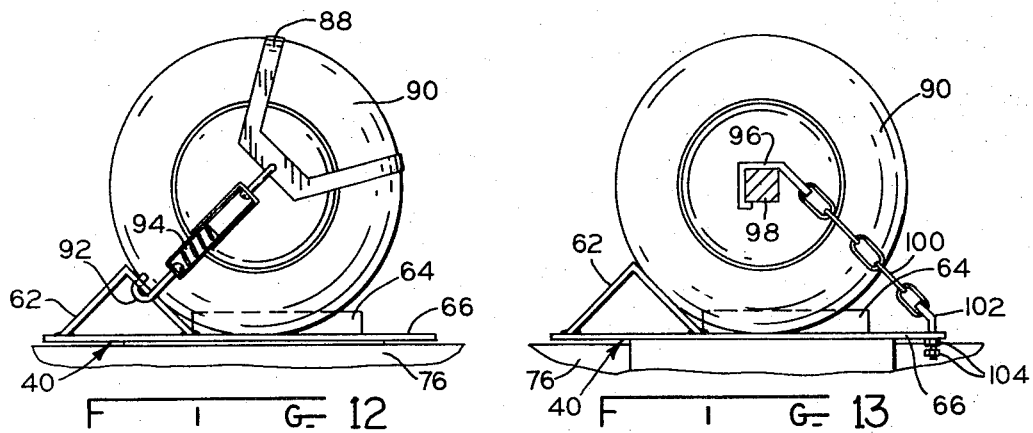
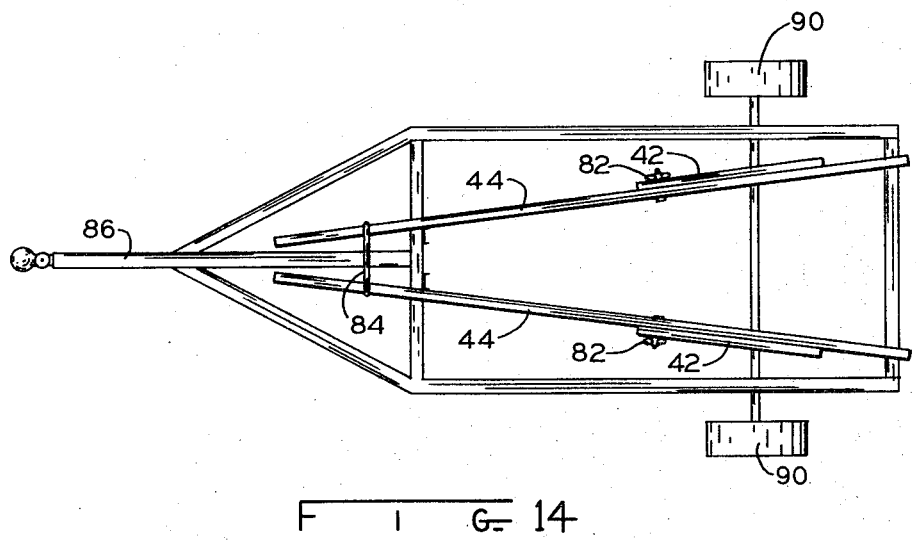

BOAT TRAILER LOADING AND SUPPORTING DEVICE

The present invention relates to a boat trailer support device, especially such a device adapted for mounting on a pickup truck and having a hoist for moving the boat trailer to and from the device.

Numerous devices have been constructed for carrying a boat trailer on a pickup truck or the like, but such devices have heretofore been complex and expensive and have, in one way or the other, interfered with free access to the cargo space of the pickup truck.

The present invention has, as a primary objective, the provision of a boat trailer support device, especially adapted for use with a pickup truck and a power operated hoist mechanism associated therewith which eliminates all the drawbacks previously encountered in respect of devices of this nature.

A still further object of the present invention is the provision of removeable ramps associated with the support device along which the boat trailer is moved when it is pulled up on the device, or removed therefrom, and which ramps can readily be stored on the trailer frame, thereby eliminating any interference with the movement of cargo into and out of the cargo space of the pickup truck.

A further object of the present invention is the provision of a device for supporting a boat trailer on a pickup truck in which the boat is supported at a favorable angle and is located longitudinally of the pickup truck so as to dispose the load of the boat trailer and the boat thereon favorably with respect to the truck.

A further object of the present invention is the provision of a boat trailer supporting device, especially for a pickup truck, which is inexpensive and light in weight and which can easily be attached to a pickup truck and easily removed therefrom.

The foregoing objects of the present invention as well as still other objects and advantages thereof will become more apparent upon reference to the following detailed specification taken in connection with the accompanying drawings in which:

FIG. 4 is a plan view drawn at somewhat enlarged scale and looking down on top of that part of the boat trailer support device that extends over the cab of the pickup truck and out over the hood portion thereof.

FIG. 5 is a side view of FIG. 4.

FIG. 6 is a plan view, partly disassembled and looking down on top of the wheel support pads forming a part of the device and which are mounted on the body of the truck above the rear wheels, and the detachable ramp members leading therefrom toward the rear of the truck and then downwardly toward the ground.

FIG. 7 is a side view of FIG. 6.

FIG. 8 is a sectional view indicated by line VIII—VIII on FIG. 5.

FIG. 9 is a sectional view indicated by line IX—IX on FIG. 7.

FIG. 10 is a sectional view indicated by line X—X on FIG. 7.

FIG. 11 is a sectional view indicated by line XI—XI on FIG. 6.

FIG. 12 is a fragmentary view showing a trailer wheel anchored to the wheel support pad and viewed from the outside of the wheel.

FIG. 13 is a view showing how the axle extending between the trailer wheels is connected to the wheel pad.

FIG. 14 is a plan view looking down on top of the trailer showing the manner in which the ramp members are connected to the trailer structure for transport.

Figure 1:
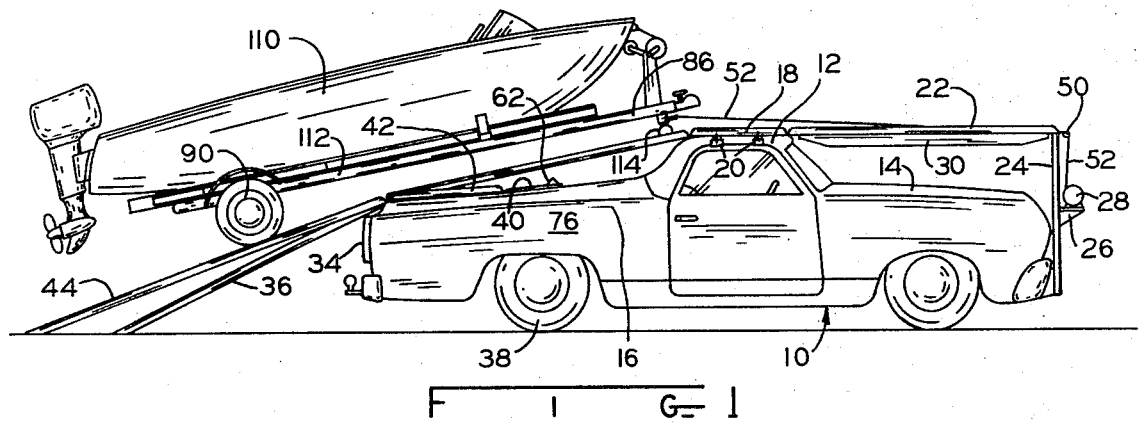
FIG. 1 is a side elevational view, showing a pickup truck with a boat supporting device according to the present invention mounted thereon and with a boat trailer having a boat thereon in intermediate position between loaded position on the device and the ground.

BRIEF SUMMARY OF THE INVENTION:

According to the present invention, a pickup truck having a trailer supporting device according to the present invention is provided with wheel supporting pads for the boat trailer wheels mounted on the body of the pickup truck above the rear wheels of the truck. The trailer supporting device according to the present invention also comprises a centrally disposed longitudinal rail or channel extending from the rear end of the cab of the pickup truck forwardly to about the front end of the truck. The front end of the rail is connected to a vertical post which, at the lower end, is attached to the bumper of the truck or to the frame thereof. A winch is mounted on the post, preferably an electrically operable winch, and a cable leads therefrom over rollers distributed along the aforementioned rail. The rail may be made up of rearward and forward portions with the rearward portion of the rail advantageously attached to the roof of the cab of the pickup truck by a luggage carrier or the like, and which may be of conventional manufacture.

The centrally disposed rail or channel includes means for connection to the rear end thereof of a further rail, or channel which extends backwardly from the truck cab and rests on the top of the tail gate of the pickup truck. A still further rail is connected to the last mentioned rail at about the region of the tail gate of the truck and extends angularly downwardly to the ground. The rails referred to above, and which have an upwardly opening track formed therein, are adapted for receiving the small wheel dependant from a boat trailer at the front end thereof for guiding the wheel and, therefore, the front end of the boat trailer longitudinally along the vertical central plane of the pickup truck body.

Extending rearwardly along the truck body from the rear end of each of the above mentioned wheel support pads are further upwardly opening channel members which terminate near the back end of the truck body. To the rear ends of these last mentioned channel members there are connected the front ends of further channel members which extend rearwardly and downwardly to the ground. The wheels of the boat trailer are adapted for being received in the last mentioned channels and for being guided therein to the wheel supporting pads.

Means are provided for tying the boat trailer down when the wheels thereof are on wheel supporting pads and, thereafter, the channels rearwardly of the wheel supporting pads and the rails, or channels, extending rearwardly from the central channel mounted on top of the pickup truck cab can be detached. When these members are detached they can be nested together and interconnected and then mounted on the boat trailer and connected thereto for transport. The cargo space of the pickup truck is now substantially unimpeded while, furthermore, a rear end hitch on the pickup truck can be provided for connection thereof to a further boat trailer or to a camping trailer, or the like.

DETAILED DESCRIPTION OF THE INVENTION

Figure 2:
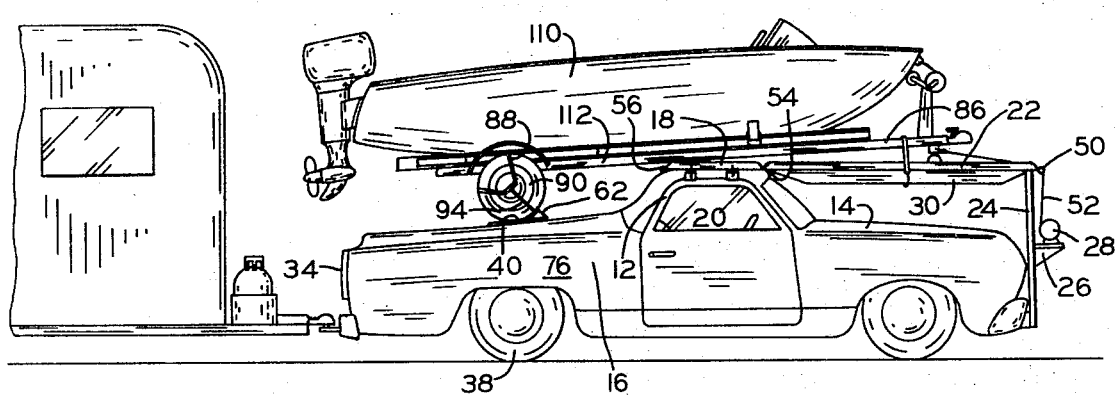
FIG. 2 is a view like FIG. 1, but shows the boat trailer on the support device in fully loaded, transport, position and with a trailer connected to a trailer hitch at the rear end of the truck.
Figure 3:
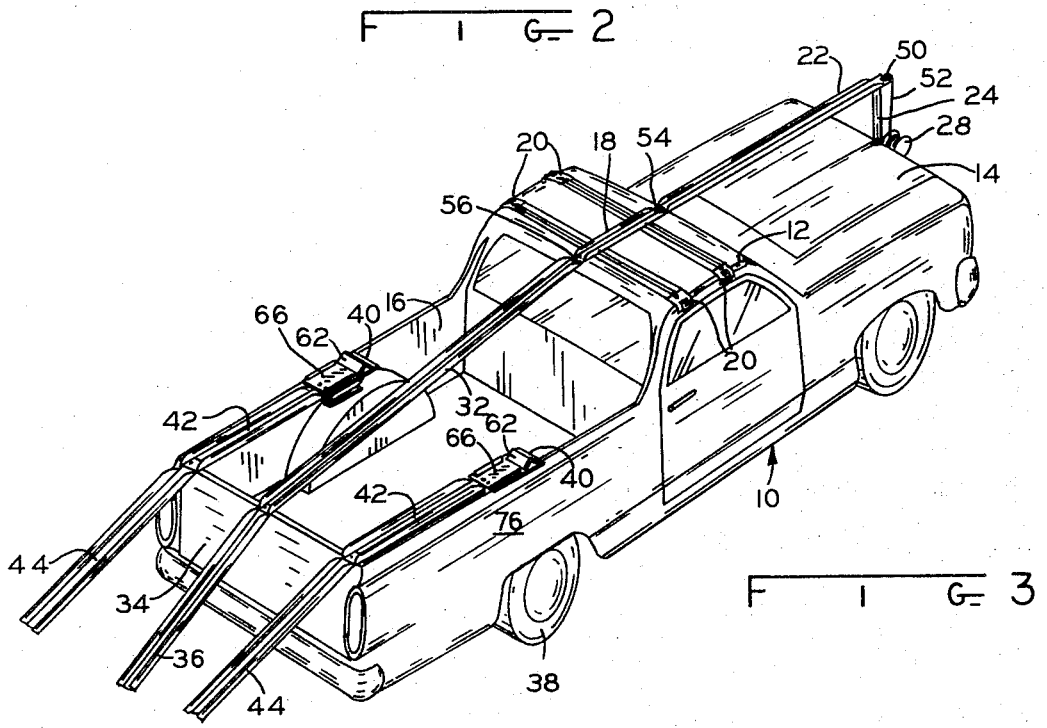
FIG. 3 is a perspective view looking down on top of the truck showing the device according to the present invention and also showing the ramps forming a part of the device and employed during movement of the boat trailer to and from the support device.

Referring to the drawings somewhat more in detail, FIGS. 1 to 3 show a pickup truck 10 of substantially conventional construction and having intermediate the length thereof a cab portion 12. An engine compartment 14 which is closed by a hood extends forwardly from cab 12, while extending rearwardly from the cab is a cargo portion 16.

According to the present invention, there extends in the fore and aft direction of cab 12 and about the middle thereof an upwardly opening channel member 18 and which is fixed to the cab as by the luggage carrier arrangement 20 and which may be of a substantially conventional nature. Connected to the front end of channel 18 is a somewhat longer channel member 22 which extends forwardly from cab 12 and at the forward end is fixed to the upper end of a post 24. Post 24 extends vertically downwardly at the front end of vehicle 10 and is fixedly secured at the lower end either to the vehicle bumper or to the vehicle frame. On the forward side of post 24 there is a platform 26 on which a cable winch 28 is mounted, preferably an electrically operated cable winch.

Channel member 22, as will be seen in FIGS. 1 and 2, is preferably provided with a dependant rib 30 on the bottom extending longitudinally therealong in about the middle of the width and providing stiffening for the channel member so that it will not bend under the load of the boat trailer even under extreme conditions.

Detachably connected to the rear end of channel member 18, and extending rearwardly therefrom, is a further channel member 32, the rear end of which is supported on the upper edge of tail gate 34 of the pickup truck body. Detachably connected to the rear end of channel member 32 is still another channel member 36 which extends angularly downwardly toward the rear to ground level.

The vehicle 10 comprises rear wheels 38 and on the body of the vehicle substantially vertically above rear wheels 38 are the boat trailer wheel support pads 40. Each pad 40 is fixed to the truck body as will be explained more fully hereinafter and at the rear edge is adapted for detachable engagement with a respective upwardly opening channel member 42 which extends rearwardly from the respective pad to near the rear end of the pickup truck body. To the rear end of each channel member 42 there is detachably connected a further member 44 which extends angularly downwardly to the ground.

The relative disposition of members 44 and channel member 36 can be seen in FIG. 1 when it can be seen that channel member 36 is inclined upwardly toward the truck at a somewhat greater angle than members 44. Members 44 may be channel shaped but are advantageously "H" shaped for greater strength to prevent the weight of the boat trailer from bending the members 44 even when a relatively heavy boat is being pulled up on the truck body.

Details of the construction of the various members of the device according to the present invention can be seen in FIGS. 4 to 11, taken in connection with FIGS. 1 to 3.

FIG. 4 is a view looking down on top of channel members 18 and 22. In this view the post 24 will be seen to comprise a cylindrical post fixedly secured to the under side of the outer end of channel member 22. It will also be noted that extending outwardly from about the juncture of post 24 and channel 22 is a bracket 48 having a roller 50 therein over which the cable leading from winch 28 is entrained. This cable is indicated by reference numeral 52 in FIGS. 1, 2, and 3.

A further cable supporting roller 54 is disposed at about the juncture of channel members 18 and 22 and a still further roller 56 is disposed at about the juncture of channel member 18 with the rearwardly extending channel member 32.

Channel member 32 is adapted to be detached from channel member 18 and, to this end, channel member 32 has a pair of tabs 58 formed thereon which overly the rear end of channel member 18 toward the sides, while pins 60 are adapted to be dropped into holes provided in tabs 58 and in channel 18, or else pins are provided integral with one of channel 18 and tabs 58 and receivable in holes in the other thereof.

In any case, a load transferring, detachable, connection is effected between the adjacent ends of channel 32 and channel 18.

Turning now to FIGS. 6 and 7, one of the wheel supporting pads and the channel member 42 extending rearwardly therefrom and a fragment of a pertaining member 44 are illustrated. The wheel supporting pads 40, as will be seen in FIGS. 6 and 7 and also in FIG. 11, have at the forward end a V-shaped upwardly extending stop member 62 against which a boat trailer wheel can come to rest. The wheel support pads also have the outwardly inclined upstanding side rails 64 at opposite sides and a planar bottom member 66 to which side rails 64 and stop member 62 are secured.

The pad 40 is about twice as wide as channel member 42 and is adapted to receive channel member 42 in either of two positions so that slightly different gauges of boat trailer support wheels can be accommodated. In each position, the pad 40 has a bar-like element, or tab, 68 projecting therefrom adapted for engaging beneath the adjacent end of channel member 42. Channel member 42, on the other hand, is provided with a pair of bar-like projecting elements, or tabs, 70 adapted to fit on opposite sides of the respective one of elements 68 while holes are provided in elements 70 and in the bottom member 66 of pad 40 for receiving drop-in pins 72, or the like, for securing channel members 42 in the proper position to wheel supporting pads 40.

At the rear end channel member 42 is engaged from above by a projection 74 formed on the adjacent end of members 44 and pin means 76 are also provided for connecting members 42 and 44 together in load transmitting relation.

The aforementioned wheel support pads 40 are secured to the truck body in any suitable manner and one preferred way is illustrated in FIG. 11. In FIG. 11 the bottom plate 66 of the wheel support pad shown has a member 70 dependent therefrom which at the bottom is provided with a foot that is secured to the body by a bolt 72. The foot at the bottom of member 70 preferably rests on top of the wheel well portion 74 of the truck body. Plate 66 extends outwardly over the longitudinal side member 76 of the truck body and an angular bracket 78 secured to the bottom of bottom plate 66 of the wheel support pad receives a screw 80 by means of which the pad is held fixably on the truck body. The angular bracket 78 may be adjustably connected to bottom plate 66 of the wheel support pad, if so desired, whereby the wheel support pad can be accommodated to truck bodies of differing widths.

FIGS. 2 and 14 shows how members 42 and 44, together with members 32 and 36, can be connected together and then supportingly mounted on the boat trailer for transport. The several members may be nested together and interconnected at at least one place as by the nut and wing bolt means indicated at 82 in FIG. 14 and then placed on the boat trailer frame and connected to a portion of the boat trailer frame as by a rubber tie member, or the like, 84 which connects the forward ends of the interconnected members to the tongue 86 of the boat trailer. The several members in transport position are also illustrated in FIG. 2.

Once the boat trailer has been drawn into transport position on the device it can be secured in place as shown in FIGS. 12 and 13. FIG. 12 shows how a yoke 88 is engaged over a wheel 90 of the boat trailer and having a hook 92 connected therewith as by spring 94. Hook 92 engages a forward portion of the respective wheel supporting pad 40, for example the "V" shaped abutment member 62 thereof and snugs the wheel firmly against the abutment member.

It is advisable, additionally, to provide a positive connection of the boat trailer frame to the support device and one way of doing this is shown in FIG. 13 in which a clip 96 is provided which engages over the axle 98 of the boat trailer; clip 96 is connected by a chain 100 with a bolt 102 that extends through a hole in the respective wheel support pad and is held in place by nuts 104. The combination of the means described provides for firmly holding the boat trailer on the support device.

Returning for the moment to FIGS. 1 and 2, a boat 110 is shown nested in a conventional manner on a boat trailer 112 having ground wheels 90 at the rear end and, at the front end, having a smaller wheel 114. Means are provided for connecting cable 52 leading from power operated hoist 28 to the front end of the frame of the boat trailer and by operating the hoist the boat trailer can be pulled up the ramps and guided into transport position on the support device. The boat trailer is shown in transport position in FIG. 2. When the trailer is in transport position, one or both of the wheels are resiliently clamped against the respective abutment 62 as shown in FIG. 12 while at least one positive clamp, as shown in FIG. 13, is applied to the trailer axle. The boat is now firmly supported on the support device for transport and the ramps along which the boat trailer was drawn into transport position can readily be detached and put in transport position on the boat trailer as shown in FIGS. 2 and 14.

It will be noted that the boat rests on the pickup truck in a substantially horizontal position and the pickup truck can thereby be driven substantially at turnpike speeds without there being any substantial amount of aerodynamic forces exerted on the boat which could interfere with the operation of the pickup truck. Further, the load which the boat imposes on the truck is distributed in a favorable manner on the truck and this, also, does not interfere with efficient maneuvering of the truck while it is operating.

The wheel supporting pads 40 are fixedly bolted to the truck body but are not in such a position as to interfere with any load that might be carried in the truck body when it is not in use for transporting a boat trailer. That portion of the support device which is connected to the vehicle cab can, if desired, be readily removed therefrom but, in the normal course of events, it will not interfere in any way with the operation of the pickup truck and the carrying of loads in the cargo portion thereof. Similarly with respect to that portion of the trailer support transporting device disposed forwardly of the vehicle cab, this can readily be removed from the vehicle, if desired, but, normally, does not interfere in any way with the use of the pickup truck for any purpose whatsoever.

It will be apparent from the foregoing that the boat trailer support and loading and transport device of the present invention is easy to manufacture and is easy to install on a pickup truck and can be made relatively light through the use of aluminum extrusions for the various parts thereof. The device, accordingly, is convenient to use and can be made relatively inexpensively and has, as mentioned, the particular merit of not interfering with the use of the cargo space of the truck for normal load carrying operations.

Modifications may be made within the scope of the appended claims.

What is claimed is:

1. A device for use with a pickup truck for transporting a boat trailer comprising in combination, wheel support pads mounted on the side members of a pickup truck body adjacent the top portion thereof, said support pads positioned on said side members above and over the wheel well portions of the pickup truck, a support member disposed between said support pads and the wheel well portion of the truck for mounting said support pads in a horizontal position, a pair of removable channel members connected to said support pads and positioned rearwardly of said support pads along the top of the side members of the pickup truck, a pair of ramp members having one end detachably connected to said channel members and having the other end engaging the ground a generally horizontal member having an upwardly opening channel therein for engagement with the front center wheel of a boat trailer and having a section adapted for connection to the truck cab in about the middle thereof and having a forward end, a post connected to the forward end of said horizontal member and extending downwardly therefrom and at the lower end adapted for being fixedly connected to the front portion of the truck, said horizontal member serving to support the front wheel of the boat trailer during loading and transporting of the boat trailer.

2. A device according to claim 1 which includes power operable winch means mounted on said post and a cable leading from the winch means, and cable pulley means distributed along said horizontal member for guiding said cable from said winch along said horizontal member toward the rear, the free end of said cable being adapted for connection to the front end of a boat trailer to be moved from the ground up on said device or vice versa.

3. A device according to claim 1 in which each support pad has rails upstanding at the sides and an abutment upstanding at the forward end.

4. A device according to claim 1 in which the difference in elevation between said pads and said member in such that a boat or a boat trailer supported on said device is substantially horizontal.

5. A device according to claim 1 in which each pad has upstanding side rails thereon and an upstanding forwardly inclined wheel abutment at the front end, and clamp means engageable with at least one of the axle and side wheel of a trailer and connectable with a said pad to hold the trailer stationary on said pads.

6. A device according to claim 1 in which each pad has upstanding side rails thereon and an upstanding forwardly inclined wheel abutment at the front end, resilient first clamp means extending from a forward region of a said pad rearwardly and upwardly and engaging the adjacent side wheel of a trailer on the side opposite the abutment, and second nonresilient clamp means extending from a rearward region of said pad forwardly and upwardly and engaging the axle of the trailer.

* * * * *